United States Patent [19]

Eer Nisse

[11] 4,215,570
[45] Aug. 5, 1980

[54] MINIATURE QUARTZ RESONATOR FORCE TRANSDUCER

[75] Inventor: Errol P. Eer Nisse, Albuquerque, N. Mex.

[73] Assignee: The United States of America as represented by the United States Department of Energy, Washington, D.C.

[21] Appl. No.: 31,810

[22] Filed: Apr. 20, 1979

[51] Int. Cl.$^2$ .............................................. G01L 1/10
[52] U.S. Cl. ........................... 73/141 R; 73/DIG. 4; 310/338
[58] Field of Search ................. 73/704, 517 AV, 581, 73/DIG. 1, DIG. 4, 141 R; 310/328, 329, 338

[56] References Cited
U.S. PATENT DOCUMENTS 3,238,789 3/1966 Erdley .............................. 73/DIG. 4

OTHER PUBLICATIONS

"Technical Report on the Quartz Resonator Digital Accelerometer" by Norman R. Serra, from: AGARD (Nato Advisory Group for Aerospace Research & Development) Conference Proceedings #43, Inertial Navigation Systems & Components, Oxford, England 1967 and Brunswick, Germany 1968.

Primary Examiner—Charles A. Ruehl
Attorney, Agent, or Firm—R. V. Lupo; Dudley W. King

[57] ABSTRACT

The invention relates to a piezoelectric quartz force transducer having the shape of a double-ended tuning fork.

4 Claims, 3 Drawing Figures

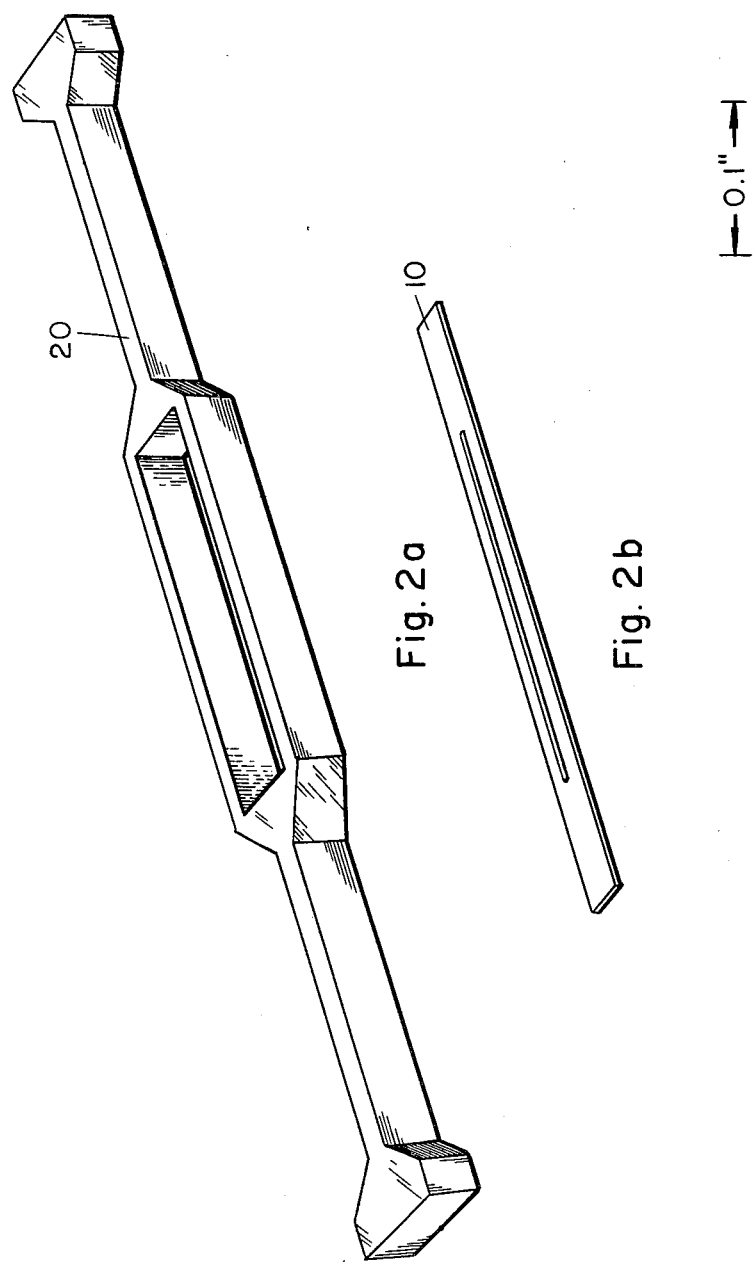

MINIATURE QUARTZ RESONATOR FORCE TRANSDUCER

BACKGROUND OF THE INVENTION

Measurement of force with high accuracy and digital output has potential for application in widely varying fields such as pressure measurement, well logging, electronic engine control, oceanography, meteorology, tilt sensors, intrusion detectors, seismology, weighing, accelerometers, and industrial process control.

A widely-used technique for force measurement utilizes a vibrating quartz resonator with frequency of vibration proportional to the force applied. These resonators are capable of high resolution and result in a digital output which make them attractive for use with digital microprocessors. However, existing quartz resonators require precision machining of complex shapes which may be prohibitively expensive to manufacture or which may result in costly, unreliable units.

A desirable property of a vibrating quartz resonator force transducer is to have a high mechanical Q. Q is proportional to the ratio of energy stored to energy lost per cycle in the vibration system. A lower Q means that a larger source of external energy must be supplied to maintain the oscillations and the oscillator will possess a less stable resonant frequency. The present invention generally possesses a higher mechanical Q than that available with existing quartz resonator force transducers.

Some quartz resonator force transducers are exemplified by U.S. Pat. Nos. 3,399,572; 3,470,400; 3,479,536; 3,505,866; 4,020,448; 4,067,241; 4,091,679; 4,104,920, and 4,126,801. As can be seen, these resonators either require complex and therefore expensive crystal shapes or complex and therefore expensive metal parts.

SUMMARY OF THE INVENTION

In view of the difficulties and disadvantages as noted above, it is an object of this invention to provide a novel force transducer.

It is a further object of this invention to provide a relatively simple and inexpensive quartz resonator force transducer.

It is a still further object of this invention to provide a digital force transducer with high resolution and accuracy.

It is another object of this invention to provide a piezoelectric quartz resonating force transducer with high Q.

The invention comprises a thin, rectangular piezoelectric quartz crystal divided into two end portions and two wide bar portions by a narrow slot. Each bar is excited into vibration by electrical contacts carried thereon and an appropriate oscillator circuit. The frequency of vibration is dependent on the magnitude of forces transmitted from the end portions to the bar portions.

BRIEF DESCRIPTION OF THE DRAWINGS

Other objects and advantages of the present invention will be apparent to those skilled in the art from the following description with references to the appended claims wherein like numbers denote like parts and wherein:

FIGS. 2a and 2b illustrate, approximately to scale, a previous quartz resonator force transducer and that of the present invention.

DETAILED DESCRIPTION OF THE PREFERRED EMBODIMENT

Figure 1:
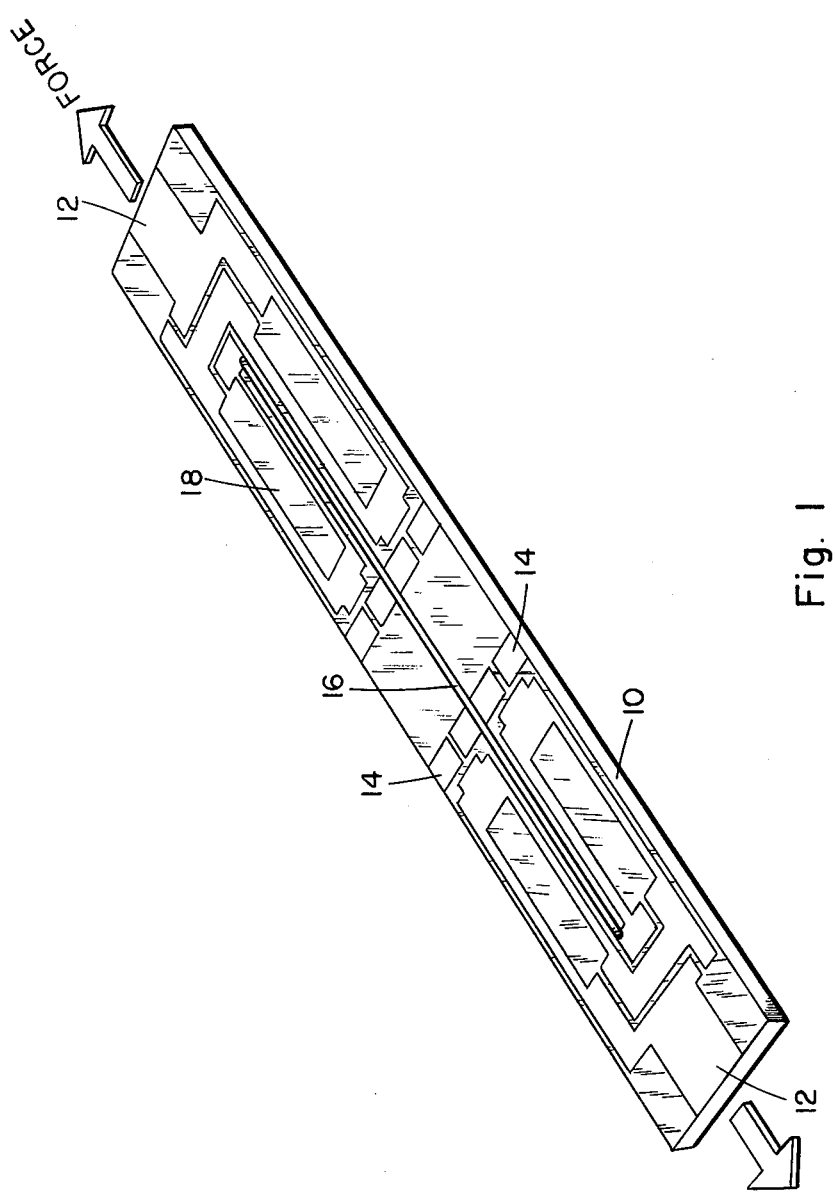
FIG. 1 illustrates in perspective the quartz resonator force transducer of the present invention.

Reference is now made to FIG. 1 which illustrates in perspective the quartz resonator force transducer 10 of the present invention. This transducer may be likened to two tuning forks secured or glued end-to-end (as indeed were some early developmental examples of the invention).

The transducer may be very small; the embodiment illustrated is generally rectangular and only 0.4 inches long and only 4 mils (1mil=0.001 inch) thick. The device may be fabricated by photolithographic etching techniques from a thin quartz sheet. These techniques are well-adapted to the mass production of this invention with final actual costs estimated to be less than one dollar per transducer. The quartz sheet may be made by cutting a thin layer from a larger quartz crystal in a desired crystalographic orientation so as to minimize the frequency dependence on temperature. With the present invention, a sheet cut about 4 mils thick and at an orientation of $+1\frac{3}{4}$ degrees from the XY crystal plane and rotated about the X-axis has proven satisfactory.

The preferred embodiment is relatively wide in comparison to its thickness; its width (W) of 35 mils is about 10 times its thickness (T). Its length (L) of about 400 mils is about 100 times its thickness (T). The term "about" is intended to include values ±50% from the given figure.

A narrow slot 16 is photolithographically etched through the transducer 10 so as to provide the transducer into two non-vibratory end portions 12 and two vibratory bar portions 14. The slot is extremely narrow being about 3 mils wide or having a width ($W_s$) less than thickness (T). The slot and therefore each bar portion has a length ($L_s$ or $L_b$) about 240 mils or 60% of the overall length (L).

Each bar portion 14 therefore has a width ($W_b$) of about 16 mils which is about 4 times their thickness (T). In an alternate embodiment, this width $W_b$ is trimmed to about 10 mils or about 2.5 times thickness (T).

Each end portion is at least as long from end of slot 16 to the outer extremity as it is wide and preferably has a length ($L_e$) of about 80 mils or about 2 times width (W).

Along the top surface (and/or bottom surface) of each bar portion 14 is a photolithographically defined metallic electrode. In operation, these electrodes are connected to an oscillator circuit which provides the necessary energy to cause the bars of the piezoelectric quartz transducer to vibrate at a characteristic frequency.

Because the end portions 12 serve to couple together the vibrations of the bar portions 14 in an efficient manner isolating them from the extremities of the transducer, the transducer has a Q of about 100,000 as measured in vacuum. When forces are applied to the extremities of the transducer, the vibrations of each bar are changed by an equal amount and are detected as a change in frequency of the oscillator circuit. The narrowness of the slot aids in insuring that the force applied to each bar is equal, so that the change in vibration is equal, and so that the vibration of each bar does not fall out of phase with the other.

The narrowness of the slot further aids in insuring a high Q in that during vibration, the flexing of one bar portion causes a slight flexing of the end portion which, in turn, is efficiently transmitted to the second flexing bar. This process effectively couples the vibrations of the two bars and helps correct any tendency to vibrate at differing frequencies.

A quartz force transducer made as described hereinabove would be capable of sensing forces as small as 1 dyne (0.00003 ounce) and as large as 1,000,000 dynes (2 pounds) with a resolution of 1 part per 1,000,000. Such a transducer would have a Q of 100,000 and require only 10 microwatts of electrical power to maintain the oscillation. It has been found that the use of a pair of the above transducers in a double-cantilever geometry will further increase sensitivity by a factor of 40.

A previous double-ended tuning fork quartz resonator force transducer 20 and that of the present invention 10 are shown to scale in FIG. 2. The force transducer of FIG. 2a is described in U.S. Pat. No. 3,238,789 and in a publication entitled "Technical Report on the Quartz Resonator Digital Accelerometer", Norman R. Serra, 43rd AGARD Conference Proceedings 1967.

The actual dimensions of the earlier device are taken from the Serra paper but are also supported by FIGS. 2 and 6 of the patent. That work does not teach the critical nature of the dimensions discovered by the present inventors. Transducer 20, although of roughly equivalent size, does not teach certain critical dimensions of transducer 10. For example, the central hole of the earlier device is 60 mils wide as opposed to the 3 mils narrow slot of the present invention. Also, the cross section of the arms of the earlier device is 40 mils deep by 10 mils wide as opposed to the 4 mils deep by 16 mils wide of the present invention.

The Q reported for the earlier device is approximately 32,000 as opposed to the 100,000 of the present invention. It is felt that the critical features discovered by the present inventor account for this suprising difference.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A force transducer comprising a thin, rectangular piezoelectric quartz crystal having two non-vibratory end portions for transmitting forces equally to intermediate interconnecting bar portions, two intermediate continuous vibratory bar portions intermediate and integral with said end portions spaced from each other by a narrow slot through said crystal with slot ends disposed equidistant from each end portion of said crystal and extending along the midportion of the crystal; said quartz crystal having thickness T, length L about 100T, width W about 10T, said slot having length $L_s$ about 0.6L and width $W_s$ no greater than T, said end portions having length $L_e$ about 2W and each of said bar portions having length $L_b$ about $L_s$ and width $W_b$ greater than 2.5T; means carried by each of said bar portions and extending therealong throughout the lengths of each of the bar portions for setting the bar portions into resonant vibrations at frequencies proportional to forces applied to said end portions; said end portions coupling together the vibrations of each bar portion to provide a mechanical Q about 100,000.

2. the force transducer of claim 1 wherein thickness T is about 4 mils.

3. The force transducer of claim 1 wherein said means for setting said bar portions into resonant vibration comprises electrodes disposed on at least one of upper or lower surfaces of the quartz crystal.

4. The force transducer of claim 1 wherein said crystal is of quartz cut at any orientation of $+1\frac{3}{4}°$ from the XY crystal plane and rotated about the X-axis and has a thickness T of about 4 mils.

* * * * *